United States Patent
Groult et al.

(10) Patent No.: US 8,810,434 B2
(45) Date of Patent: Aug. 19, 2014

(54) METHOD AND SYSTEM FOR SUPPORTING A DRIVER OF A VEHICLE IN MANOEUVRING THE VEHICLE ON A DRIVING ROUTE AND PORTABLE COMMUNICATION DEVICE

(75) Inventors: Xavier Groult, Survilliers (FR); Siav-Kuong Kuoch, Saint-Maur-des-Fosses (FR)

(73) Assignee: VALEO Schalter und Sensoren GmbH, Bietigheim-Bissingen (DE)

( * ) Notice: Subject to any disclaimer, the term of this patent is extended or adjusted under 35 U.S.C. 154(b) by 10 days.

(21) Appl. No.: 13/813,660

(22) PCT Filed: Aug. 4, 2011

(86) PCT No.: PCT/EP2011/063449
§ 371 (c)(1),
(2), (4) Date: Feb. 1, 2013

(87) PCT Pub. No.: WO2012/019961
PCT Pub. Date: Feb. 16, 2012

(65) Prior Publication Data
US 2013/0127641 A1    May 23, 2013

(30) Foreign Application Priority Data
Aug. 11, 2010   (EP) .................................. 10008357

(51) Int. Cl.
*B60Q 1/48*    (2006.01)
*G08G 1/14*    (2006.01)

(52) U.S. Cl.
USPC .................... 340/932.2; 340/943; 180/168

(58) Field of Classification Search
USPC .............. 340/932.2, 937, 933, 943, 435, 436, 340/438; 701/1, 70; 180/167, 168
See application file for complete search history.

(56) References Cited

U.S. PATENT DOCUMENTS

| 6,163,253 | A | 12/2000 | Yaron et al. |
| 6,564,123 | B2 * | 5/2003 | Hahn et al. ........................ 701/1 |
| 6,819,231 | B2 * | 11/2004 | Berberich et al. ............ 340/435 |
| 2002/0163444 | A1 | 11/2002 | Budnovitch |
| 2007/0282489 | A1 | 12/2007 | Boss et al. |
| 2009/0115630 | A1 | 5/2009 | Oelrich et al. |

FOREIGN PATENT DOCUMENTS

| JP | 2000-41238 A | 2/2000 |
| JP | 2001-114046 A | 4/2001 |

OTHER PUBLICATIONS

International Search Report issued in PCT/EP2011/063449 mailed Sep. 22, 2011 (3 pages).

* cited by examiner

*Primary Examiner* — Toan N Pham
(74) *Attorney, Agent, or Firm* — Osha Liang LLP

(57) ABSTRACT

The invention relates to a method for supporting a driver of a vehicle (2) in maneuvering the vehicle (2) on a driving route (4), in particular when parking a vehicle (2) into or out of a parking space (3), with the aid of a portable communication device (13). At least one vehicle external sensor device (11, 17) is provided which is arranged stationarily relative to the driving route (4). The sensor device (11, 17) captures data relating to the vehicle (2) located on the driving route (4) and wirelessly emits signals (15, 15') comprising the captured data in such a way that same signals (15, 15') reach the interior of the vehicle (2). The signals (15, 15') are received through the portable communication device (13), and the data are output through the portable communication device (13). The invention also relates to a system (10) as well as a portable communication device (13).

8 Claims, 3 Drawing Sheets

Figure 1:
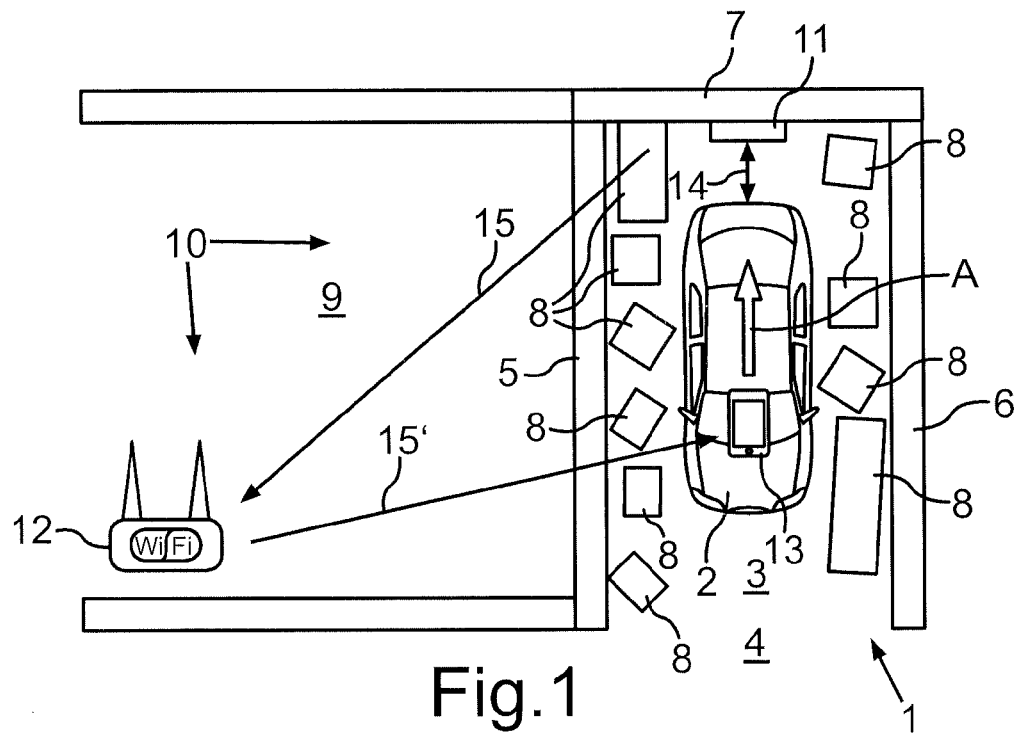

METHOD AND SYSTEM FOR SUPPORTING A DRIVER OF A VEHICLE IN MANOEUVRING THE VEHICLE ON A DRIVING ROUTE AND PORTABLE COMMUNICATION DEVICE

The invention relates to a method for supporting a driver of a vehicle in manoeuvring the vehicle on a driving route, in particular when parking the vehicle into a parking space. The driver is supported by means of a portable communication device. The invention moreover relates to a corresponding system as well as a portable communication device, in particular a mobile phone (smart phone).

In the present case, the interest is directed preferably at supporting the driver of a vehicle in parking the vehicle into a parking space, namely in particular into a garage or alike. In particular, this concerns a parking space that is very frequently—for instance daily—parked into by the driver. It is prior art to employ a vehicle external camera that can for instance be mounted stationarily in a garage, namely for example on a wall. Such a camera then records images of the garage. These images then can be transmitted to a display which is mounted stationarily within the interior of the vehicle. The driver is provided with images on the display which show the vehicle in the garage. In this way, the driver is supported in parking the vehicle into the garage as well as in parking it out of the garage. Such method is known for instance from the documents JP 2000 041 238 A and JP 2001 114 046 A. In the prior art it is to be seen as disadvantageous that the vehicle needs to be equipped with a corresponding system including the display and a communication interface. In particular such method thus is not suited for more senior vehicles as well as for vehicles without a display.

It is the task of the invention to show a way how the driver of a vehicle can be supported in manoeuvring the vehicle on a driving route without much effort, in particular without requiring expensive stationarily mounted systems to be employed in the vehicle.

This task according to the invention is solved by a method with the features according to patent claim 1, by a system with the features according to patent claim 9, as well as through a portable communication device having the features of patent claim 10. Advantageous embodiments of the invention are subject matter of the dependent patent claims and the description.

In a method according to the invention a driver of a vehicle is supported in manoeuvring the vehicle on a driving route, in particular when parking the vehicle into or out of a parking space. The driver in this connection is supported with by means of a portable communication device, namely for instance with the aid of a mobile phone. At least one sensor device which is mounted external to the vehicle—separate from it—is provided. The sensor device is arranged stationarily relative to the driving route. The sensor device captures data relating to the vehicle located on the driving route. Signals are sent out which contain the captured data. The signals reach the interior of the vehicle. The portable communication device receives the said signals and outputs the captured data, namely in particular within the interior of the vehicle.

The effect according to the invention is thus achieved on the one hand by the vehicle being captured through a vehicle external sensor device and on the other hand by data being transmitted by the sensor device to a portable communication device of the driver. The portable communication device then receives the captured data relating to the vehicle and can output these data, namely for instance by means of a display and/or an acoustic output device, such as a loudspeaker. The present invention has the advantage over the prior art that no expensive systems stationarily mounted in the vehicle—namely no display stationarily mounted in the vehicle as well as no communication interface stationarily mounted on the vehicle—are required. The method according to the invention namely does without a component stationarily mounted in the vehicle as it is employed in the prior art for driver support. The present invention by contrast employs a portable communication device for driver support as it is available on the market in a plurality of designs already. The driver thus can be supported in manoeuvring the vehicle at minimum effort: All he requires is a portable communication device—such as a mobile phone—configured to receive and output the data captured by the vehicle external sensor device. The method thus can be performed at relatively low cost.

The method turns out to be particularly advantageous in particular for supporting the driver in parking the vehicle into or out of a garage. The vehicle external sensor device can namely be mounted stationarily in the garage, and it can capture the vehicle being located in the garage. The driver then can be informed about the instantaneous position or arrangement of the vehicle within the garage, namely with the aid of the portable communication device which receives and outputs the captured data. The parking of the vehicle into and out of the garage thus is rendered particularly easy for the driver.

It is preferably a motor vehicle, in particular a passenger car, in the manoeuvring of which the driver is supported with the aid of the portable communication device.

A portable communication device here relates to a mobile device which is formed separately from the vehicle and thus represents a component independent of the vehicle architecture. The portable communication device may for instance be a mobile phone (smart phone) or a mobile personal computer, such as for instance a personal digital assistant (PDA). The portable communication device preferably comprises a communication interface for wireless communication, in particular in accordance with a WLAN standard (Wireless Local Area Network). It may also have a display on which information relating to the data captured by the vehicle external sensor device can be displayed.

As already set out, the method may serve for supporting the driver in manoeuvring the vehicle in a garage. As a garage usually connects to a living space or a residential building, in one embodiment it is provided that via a router the signals are transmitted from the vehicle external sensor device to the portable communication device. For this purpose for instance a router usually already provided in a building can be employed. The signals may be transmitted via the router for instance in accordance with a communication standard of the IEEE-802.11 family, i.e. in accordance with the WLAN standard. By way of employing a router a relatively large distance range of the emitted signals can be achieved. The portable communication device thus can receive the signals, even when the driver with his vehicle is relatively far away from the vehicle external sensor device. Accordingly, the vehicle external sensor device may also be set up in a cost-efficient way: It can generate signals of a relatively low power, and the router can then amplify these signals or provide new signals of higher power and thus higher range of transmission.

In general, this means that the data transmission between the portable communication device and the vehicle external sensor device can be effected in accordance with the WLAN standard, i.e. in accordance with a communication standard of the IEEE-802.11 family.

In one embodiment, the portably communication device—namely in particular a software running on this device—can automatically identify the vehicle external sensor device. If the signals are transmitted between the vehicle external sensor device and the portable communication device via a router, the portable communication device can automatically identify the sensor device through the router. The portably communication device can identify the sensor device, if the portable communication device is within reach of the router. If the sensor device is identified by the portable communication device, the vehicle external sensor device may be activated automatically due to this identification, namely by the portable communication device. This has the advantage that the sensor device can only be activated and thus only consumes electrical energy, when it is actually required, namely when the driver with his portable communication device is in the vicinity of the vehicle external sensor device. In this way electrical energy may be saved.

It is particularly advantageous, if a distance sensor is provided as vehicle external sensor device. It is preferably an ultrasonic sensor which is preferably arranged stationarily relative to the driving route. Such distance sensor then can capture a distance between the distance sensor and the vehicle. The distance sensor can then transmit data relating to the distance to the portable communication device. This means that the distance sensor can transmit data to the portable communication device which contain information about the instantaneous distance between the distance sensor and the vehicle. The portable communication device in this embodiment can receive these data and output information about the measured distance. For instance the actual distance value can be shown on a display of the portable communication device. In addition or alternatively information about the measured distance can also be output by means of a loudspeaker. The driver thus is provided with information about the actual distance between his vehicle and the distance sensor and thus is supported in manoeuvring the vehicle on the driving route. This embodiment, too, is of particular advantage when employed in a garage: The distance sensor can for instance be mounted on a back wall in the garage which the vehicle is approaching whilst parking into the garage. The driver can then decide on the basis of the information of the portable communication device, whether he can park further into the garage or not. The portable communication device namely can output the current distance value without the vehicle having to be equipped with any sensor.

In addition or as an alternative to a distance sensor, a camera may be provided as vehicle external sensor device. Such camera can equally be arranged stationarily relative to the driving route. The camera can capture image data about the vehicle being driven on the driving route; the captured images can then be transmitted to the portable communication device. This means that in this embodiment images which are captured by the vehicle external camera can be shown on a display of the portable communication device. Here, too, the camera can be mounted in the garage, namely for instance on a wall in the garage. The camera can for instance be mounted on a back wall of the garage which the vehicle approaches when parking into the garage. The driver then is provided with images shown on the display of the portable communication device showing both at least one portion of the garage—in particular the complete interior of the garage—as well as the vehicle entering the garage. In this way manoeuvring the vehicle on the driving route is rendered easier for the driver; on the basis of the displayed images the driver can namely estimate the distances between the vehicle and other objects.

As already set out in the above, the driver is supported with the aid of the portable communication device preferably when parking into a parking space—in particular a garage.

The vehicle external sensor device can be stationarily mounted within the parking space in such a way that the vehicle external sensor device already captures the vehicle when the vehicle at least partially is positioned within the parking space. In this way the driver is supported in parking the vehicle into or out of the parking space.

Preferably the sensor device is stationarily arranged within a garage into or out of which the vehicle is parked. Then the advantages of the invention develop their full bearing.

In one embodiment the sensor device can be activated by means of the portable communication device. For instance the driver may make an input into the portable communication device—for instance at an operating device and/or via a microphone—and the portable communication device due to this input can transmit control signals which trigger an activation of the sensor device through a router and/or directly to the sensor device. On the basis of these control signals the sensor device for instance can be switched from a standby mode into an active mode. This embodiment is particularly user-friendly. The driver can activate the vehicle external sensor device from the distance, namely with the aid of the portable communication device. The portable communication device in this embodiment quasi has the function of a remote control. In this embodiment the driver with the aid of his portable communication device can also activate the sensor device, when he is outside the vehicle and the vehicle is for instance in a garage. The driver can activate the sensor device and obtain information about the vehicle or observe the vehicle on a display of the portable communication device.

Moreover, according to the invention a system is provided which is configured for supporting a driver of a vehicle in manoeuvring the vehicle on a driving route, in particular when parking the vehicle into a parking space. The system comprises a vehicle external sensor device stationarily arranged relative to the driving route. The sensor device can capture data relating to the vehicle on the driving route and can wirelessly emit signals with the captured data in such a way that same signals reach the interior of the vehicle. The system also comprises a portable communication device which can receive the signals in the interior of the vehicle and output the captured data. The system can also comprise the driving route—and in particular also the parking space—and/or the vehicle.

A portable communication device according to the invention—in particular a mobile phone—is configured to receive signals containing data captured by a distance sensor, in particular an ultrasonic sensor, and concerning a distance. The portable communication device is also configured to output the data. Preferably, the distance sensor is a vehicle external sensor—separate from the vehicle—which can measure a direct distance between the sensor and a vehicle.

The preferred embodiments presented with regard to the method according to the invention and their advantages in analogy apply to the system according to the invention as well as the communication device according to the invention.

Further features of the invention derive from the claims, the figures, and the description of the figures. All features and feature combinations previously mentioned in the description as well as the features and feature combinations in the following named in the description of the figures and/or shown in the figures alone are not only usable in the combination given in each case, but also in other combinations or also taken alone.

The invention now is set out in more detail on the basis of individual preferred embodiments as well as with reference to the enclosed drawings.

Figure 2:
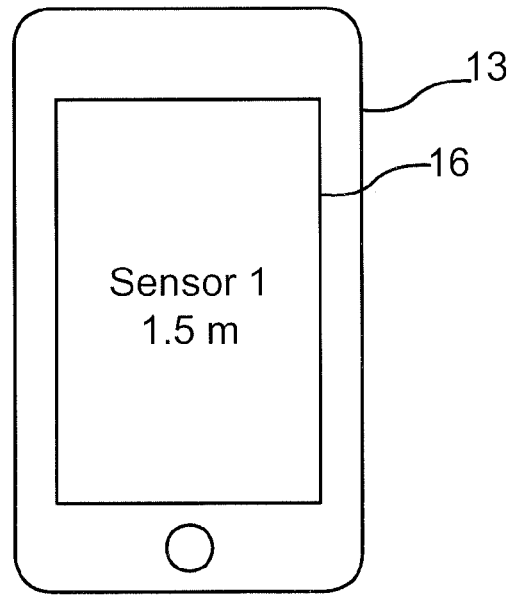
Figure 3:
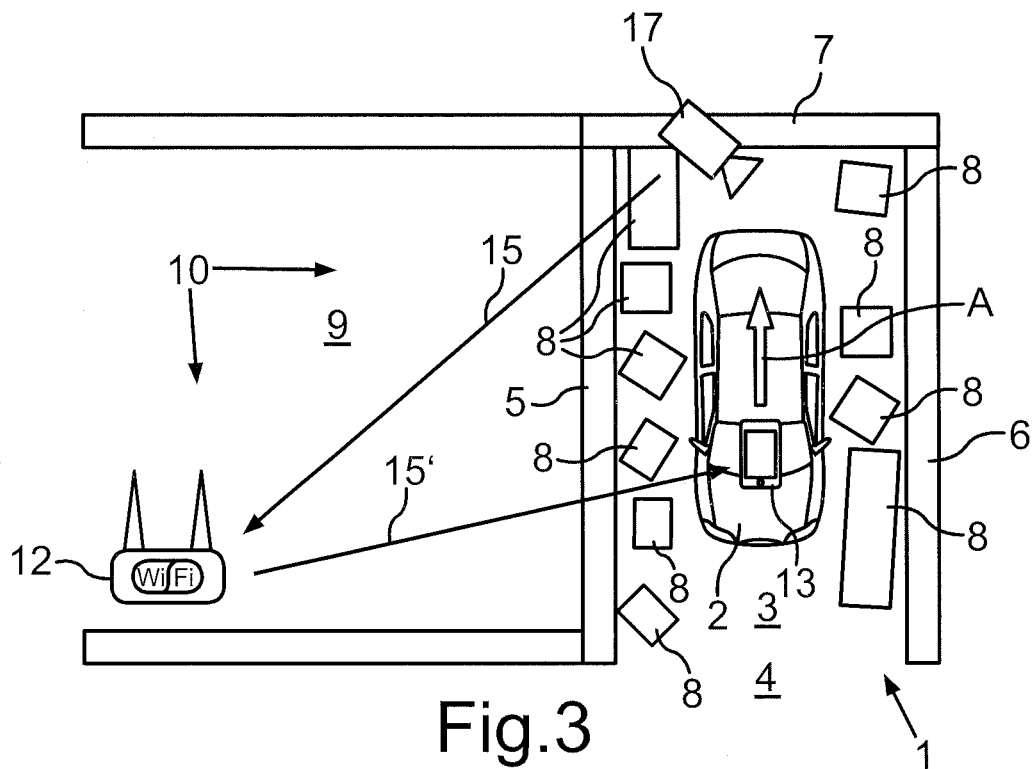
Figure 4:
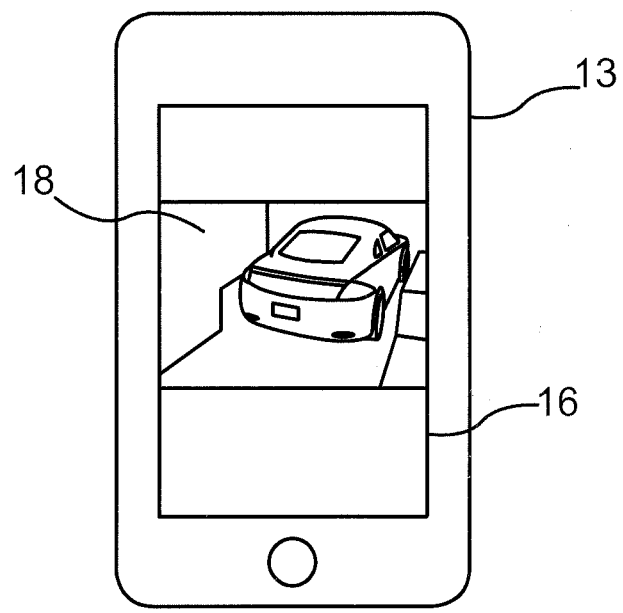
Figure 5:
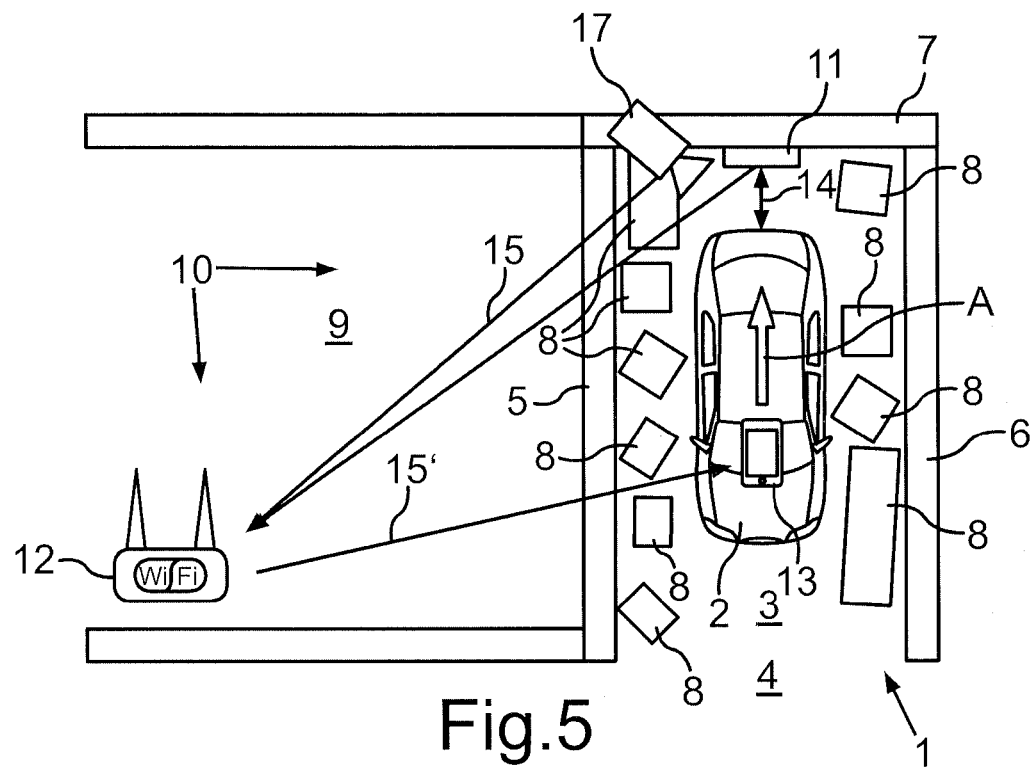
Figure 6:
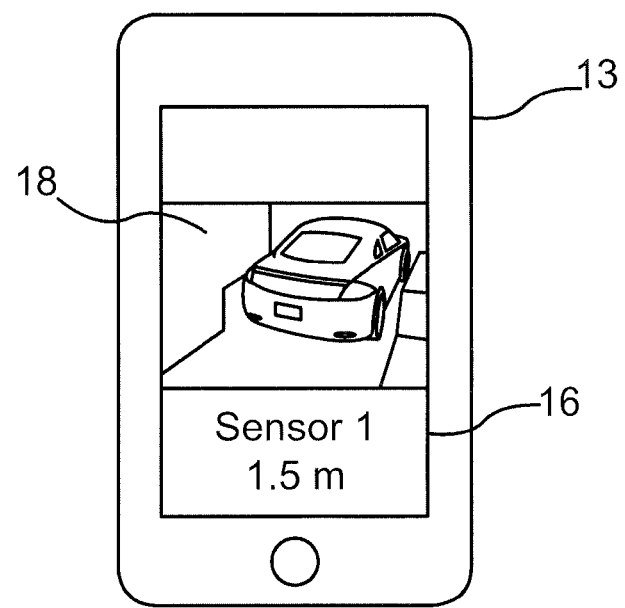

They show in:

FIG. 1 a schematic view of a system according to a first embodiment of the invention;

FIG. 2 a schematic view of a portable communication device of the system according to FIG. 1;

FIG. 3 a schematic view of a system according to a second embodiment of the invention;

FIG. 4 a schematic view of a portable communication device of the system according to FIG. 3;

FIG. 5 a schematic view of a system according to a third embodiment of the invention; and FIG. 6 a schematic view of a portable communication device of the system according to FIG. 5.

In the figures equal elements and elements of equal functions are assigned the same reference signs.

In a garage 1 is a vehicle 2 which in the present embodiment is a passenger car. The garage 1 contains a parking space 3 in which the vehicle 2 stands. To the parking space 3 leads a driving route 4 along which the vehicle 2 can be parked into the garage 1; the parking space 3 is part of the driving route 4. The parking space 3 is in principle delimited within the garage 1 by walls, namely two side walls 5, 6, as well as a back wall 7 and a front wall (not shown in the figures) which can have a gate. When the vehicle 2 is being parked into the garage 1, the vehicle 2 approaches the back wall 7 during the parking operation. However, there are also a plurality of objects 8 in the garage 1 through which the parking space 3 is immediately delimited laterally.

The garage 1 immediately connects to a living space 9, namely for instance a flat, a house, or the like. The side wall 5 separates the living space 9 from the garage 1.

A system overall referenced to as 10 in the embodiment according to FIG. 1 comprises a distance sensor 11, a router 12, as well as a portable communication device 13.

The distance sensor 11 in the embodiment is an ultrasonic sensor; the distance sensor 11 is a vehicle external sensor device in the sense of the invention. The distance sensor 11 in this set-up is attached to the back wall 7 and captures the parking space 3 and the vehicle 2. In other words a capturing direction of the distance sensor 11 coincides with the main direction in which the garage 1 extends, namely in such a way that the distance sensor 11 measures a distance 14 between the vehicle 2 and the distance sensor 11. If the vehicle 2—according to arrow 15—parks backwards into the garage 1, the distance 14 decreases during the parking operation.

The distance sensor 11 can for instance be wirelessly connected to the router 12 or else be connected via a cable. The router 12 is a WLAN router. The distance sensor 11 measures the distance 14 and transmits signals 15 containing data relating to the distance 14 to the router 12. The router 12 receives signals 15 and emits signals 15' which equally contain the information about the distance 14 captured by the distance sensor 11. The signals 15' are transmitted in accordance with the WLAN standard, namely wirelessly.

The signals 15' reach the interior of the vehicle 2 and are then received by the portable communication device 13 which is a mobile phone in the embodiment. With reference to FIG. 2 the portable communication device 13 comprises a touch-sensitive display 16 (touch screen) which simultaneously has the function of an operating device and an optical output device. The communication device 13 can receive the signals 15' in accordance to the WLAN standard. The communication device 13 has a software which can then extract and process the information relating to the distance 14 contained in the signals 15'. On the touch screen 16 then the current distance 14 is shown, as can be seen in FIG. 2. In the embodiment according to FIGS. 1 and 2 the present distance 14 between the distance sensor 11 and the vehicle 2 amounts to 1.5 m.

If the vehicle 2 is parked into the garage 1, on the touch screen 16 of his mobile phone 13 the driver is provided with the current value of the distance 14 between the vehicle 2 and the distance sensor 11, i.e. essentially between the vehicle 2 and the back wall 7, for any given moment. This is particularly advantageous, as the driver can obtain information about the distance from the back wall 7 without his vehicle 2 needing to be equipped with corresponding sensors. The vehicle 2 thus can also be an older vehicle which has no driver assistance systems. The driver merely needs his mobile phone 3, the vehicle external distance sensor 11, as well as possibly the router 12.

With reference to FIG. 3, instead of the distance sensor 11 now there is a camera 17 as vehicle external sensor device in the garage 1. In this embodiment the camera 17 is an optical capture device that detects light within the spectral range visible to human beings and thus can capture optical images of the surroundings. The camera 17 equally is mounted on the back wall 7 and in the embodiment captures the entire parking space 13 as well as the entire vehicle 2. The camera 17 records image data about the parking space 3 as well as the vehicle 2; the signals 15 now contain the image data recorded by the camera 17. Also the signals 15' now comprise the image data of the camera 17.

These image data are received by the portable communication device 13. The images recorded by the camera 17 are displayed on the touch screen 16. This is done in real time, i.e. the camera 17 records the images continuously and transmits the image data continuously to the communication device 13. Also the communication device 13 shows the images continuously, namely in the form of a continuous film or a chronological sequence of images.

FIG. 4 shows a schematic view of the mobile phone 13 with a displayed image 18 which was recorded by the camera 17. The image 18 shows the vehicle 2 from behind. When parking the vehicle 2 into and out of a parking space, the driver thus is provided with an image of the parking space 3 with the vehicle 2 on the display 16, and thus can easily manoeuvre the vehicle 2.

In the embodiment according to FIGS. 5 and 6 both the distance sensor 11 and the camera 17 are positioned in the garage 1. This means that the embodiment according to FIG. 5 corresponds to a combination of the embodiments according to FIGS. 1 and 3. The signals 15 thus contain both the data relating to the distance 14 as well as the image data recorded by the camera 17. Also the signals 15' comprise both the distance data as well as the image data. With reference to FIG. 6 on the touch screen 16 both the image 18 of the camera 17 as well as the current distance value at any given moment are shown.

In summery, a system 10 as well as a method are provided which serve for supporting the driver in parking a vehicle into or out of a garage 1. If a vehicle external sensor device—the distance sensor 11 and/or the camera 17—are connected to the network of the router 12, this sensor device 11, 17 can be identified with the aid of a corresponding software. This software is installed on the portable communication device 13. The software running on the communication device 13 can also identify several sensor devices 11, 17 at the same time. If the driver with his communication device 13 is close enough to the router 12, he can switch on the software and let the information of the sensor device 11, 17 be displayed to him.

It is also possible that the driver can activate the sensor device 11, 17 with the aid of the portable communication device 13. For this purpose the driver can for instance make an input to the touch screen 16; due to this input the communication device 13 can then also transmit control signals to the router 12 which trigger an activation of the sensor device 11, 17.

The invention claimed is:

1. A method for supporting a driver of a vehicle in manoeuvring the vehicle on a driving route when parking the vehicle into or out of a parking space, with aid of a portable communication device, the method comprising:
   providing at least one vehicle external sensor device which is arranged stationarily relative to the driving route; capturing data relating to the vehicle present on the driving route by the sensor device; wirelessly emitting signals containing the captured data to reach an interior of the vehicle; receiving the signals and outputting the captured data by the portable communication device; and automatically identifying at least one vehicle external sensor device by the portable communication device, and as a result of the identification, activating the at least one sensor device.

2. The method according to claim 1, wherein the signals are transmitted via a router from the sensor device to the portable communication device in accordance with a communication standard of the IEEE-802.11 family.

3. The method according to claim 1, wherein an ultrasonic sensor is provided as the vehicle external sensor device, wherein a distance between the ultrasonic sensor and the vehicle is captured by the ultrasonic sensor and data relating to the distance are transmitted to the portable communication device.

4. The method according to claim 1, wherein a camera is provided as the vehicle external sensor device by which image data are captured and transmitted to the portable communication device.

5. The method according to claim 1, wherein the at least one said sensor device is arranged stationarily within the parking space in such a way that the said sensor device captures the vehicle which is at least partly in the parking space.

6. The method according to claim 1, wherein the at least one said sensor device is arranged stationarily in a garage into which the vehicle is being parked.

7. The method according to claim 1, wherein the at least one said sensor device is activated by means of the portable communication device by an input made by the driver to the portable communication device.

8. A system for supporting a driver of a vehicle in manoeuvring the vehicle on a driving route when parking the vehicle into or out of a parking space, comprising:
   a vehicle external sensor device, which is arranged stationarily relative to the driving route and which is configured to capture data relating to the vehicle on the driving route and to wirelessly emit signals with the captured data that are suitable to reach an interior of the vehicle; a portable communication device which is configured to receive the signals in the interior of the vehicle and to output the captured data, wherein the portable communication device automatically identifies at least one vehicle external sensor device and as a result of the identification, the at least one sensor device is activated.

* * * * *